United States Patent
Potochniak et al.

(10) Patent No.: US 6,263,206 B1
(45) Date of Patent: Jul. 17, 2001

(54) METHOD PROVIDING COORDINATION OF MULTIPLE CALL SWITCHING CENTERS FOR A WIRELESS SERVICE

(75) Inventors: Paul A. Potochniak, Jackson, NJ (US); Gregg R. Siegfried, Seattle, WA (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/017,607

(22) Filed: Feb. 2, 1998

(51) Int. Cl.$^7$ ........................................... H04Q 7/20
(52) U.S. Cl. ........................ 455/445; 455/561; 455/437; 455/439; 455/428; 379/220
(58) Field of Search .................... 455/431, 436, 455/437, 439, 445, 561, 428, 430, 432; 379/220, 221

(56) References Cited

U.S. PATENT DOCUMENTS

| | | | |
|---|---|---|---|
| 5,018,187 | * 5/1991 | Marinho et al. | 455/439 |
| 5,123,112 | * 6/1992 | Choate | 455/524 |
| 5,519,761 | * 5/1996 | Gilhousen | 455/431 |
| 5,606,595 | * 2/1997 | Ejzak | 370/349 |
| 5,832,380 | * 11/1998 | Ray et al. | 455/431 |
| 5,930,710 | * 7/1999 | Sawyer et al. | 455/436 |
| 5,950,129 | * 9/1999 | Schmid et al. | 455/431 |
| 6,064,882 | * 5/2000 | Coyne et al. | 455/428 |

OTHER PUBLICATIONS

TIA/EIA/IS–136.2–A Interim Standard, Oct. 1996, pp. 143–154.*
Goodman, David J., Wireless Personal Communications Systems., 1997, Addison–Wesley Wireless Communications Series, pp. 78–79.

* cited by examiner

Primary Examiner—William Trost
Assistant Examiner—Rafael Perez-Gutierrez

(57) ABSTRACT

Call management method and apparatus in a wireless communication network that route calls through multiple call switching centers. New calls are established when mobile stations seize radio links of a base station. As part of call setup, the base station determines whether the new call arrived to the base station through a hand-off technique or whether the call originated with the base station. If the call arrived by hand-off, the base station receives an identifier of a call switching center that administered the call prior to hand-off and routes the call to the identified call switching center. If the call originated with the base station, the base station communicates to the mobile station an identifier of a default call switching center that will handle the call and routes the call to the default call switching center.

15 Claims, 4 Drawing Sheets

METHOD PROVIDING COORDINATION OF MULTIPLE CALL SWITCHING CENTERS FOR A WIRELESS SERVICE

BACKGROUND OF THE INVENTION

The present invention relates to a method for providing coordination among multiple call switching centers in a wireless communication service.

Wireless communication service is well known. Typically, call traffic is exchanged between a mobile station and a base station via a pair of radio channels. The mobile station and base station communicate via one of many defined formats, such as FM, TDMA or CDMA. The base station connects to the well-known public switched telephone network ("PSTN") and, in some embodiments, routes calls to a call switching center ("CSC" or "call handler"). End to end communication between two parties may extend from a caller at the mobile station through the base through and PSTN to the CSC; the call extends back from the CSC through the PSTN to a called party.

FIG. 1 illustrates a CSC-based wireless system used in an air-to-ground communication network. There, the mobile station 110 (an "air terminal") typically is provided on an aircraft. It communicates with one of a plurality of ground stations 120–170. As the air terminal 110 travels, it may hand-off an active call from one ground station to another. According to this procedure, when the air terminal 110 determines to hand-off, it seizes a radio channel of a new ground station 130 and releases the radio channel of an old ground station 140.

The air-to-ground communication network 100 includes only one CSC 210, provided in the PSTN 200. Thus, the PSTN 200 routes calls from the ground stations to the CSC 210 and further to the called party. The CSC 210 manages calls received from mobile stations in the wireless air-to-ground communication network for authentication and billing purposes.

In such a system, a new call begins when a mobile station 110 seizes an available radio channel of a nearby ground station 140. The ground station 140 establishes a call path through the PSTN 220 to the CSC 210. If a hand-off occurs during the call, the mobile station 110 seizes a radio channel of a new ground station 130. The mobile station 110 and the new ground station 130 exchange call setup signaling by which the ground station 130 may determine that the call has arrived to the ground station 130 through hand-off rather than arriving as a newly originated call. The new ground station 130 routes the call to the CSC 210 and signals the CSC 210 to indicate that the call arrived by hand-off. Because a single CSC 210 is provided for the network, the ground station 130 may be programmed to route all calls received by hand-off to the CSC 210. In response, the CSC 210 drops the call path extending from the old ground station 140 in favor of the call path from the new ground station 130.

Wireless communication services are extremely successful. With continued success, consumer capacity will exceed the capacity of a single CSC. Multiple CSC's will be needed. The current hand procedure for handling calls received by a ground station hand-off cannot be extended to a multiple CSC system. The ground station will not know when CSC handling the calls prior to its arrival at the ground station. Accordingly, there exists a need in the art for a coordination scheme in a wireless network that maintains the integrity of communication links between a mobile subscriber and a called party during hand-off.

SUMMARY OF THE INVENTION

The disadvantages of the prior art are alleviated to a great extent by a call management technique in a wireless communication network that routes new calls through multiple call switching centers. New calls are established when mobile stations seize radio links of a base station. During call setup, the base station determines whether the new call arrived to the base station via hand-off technique or whether the call originated with the base station. If the call arrived by hand-off, the base station receives an identifier of a call switching center that handled the call prior to hand-off and routes the call to the identified call switching center. If the call originated with the base station, the base station communicates to the mobile station an identifier of a default call switching center that will handle the call and routes the call to the default call switching center.

DETAILED DESCRIPTION

Figure 1:
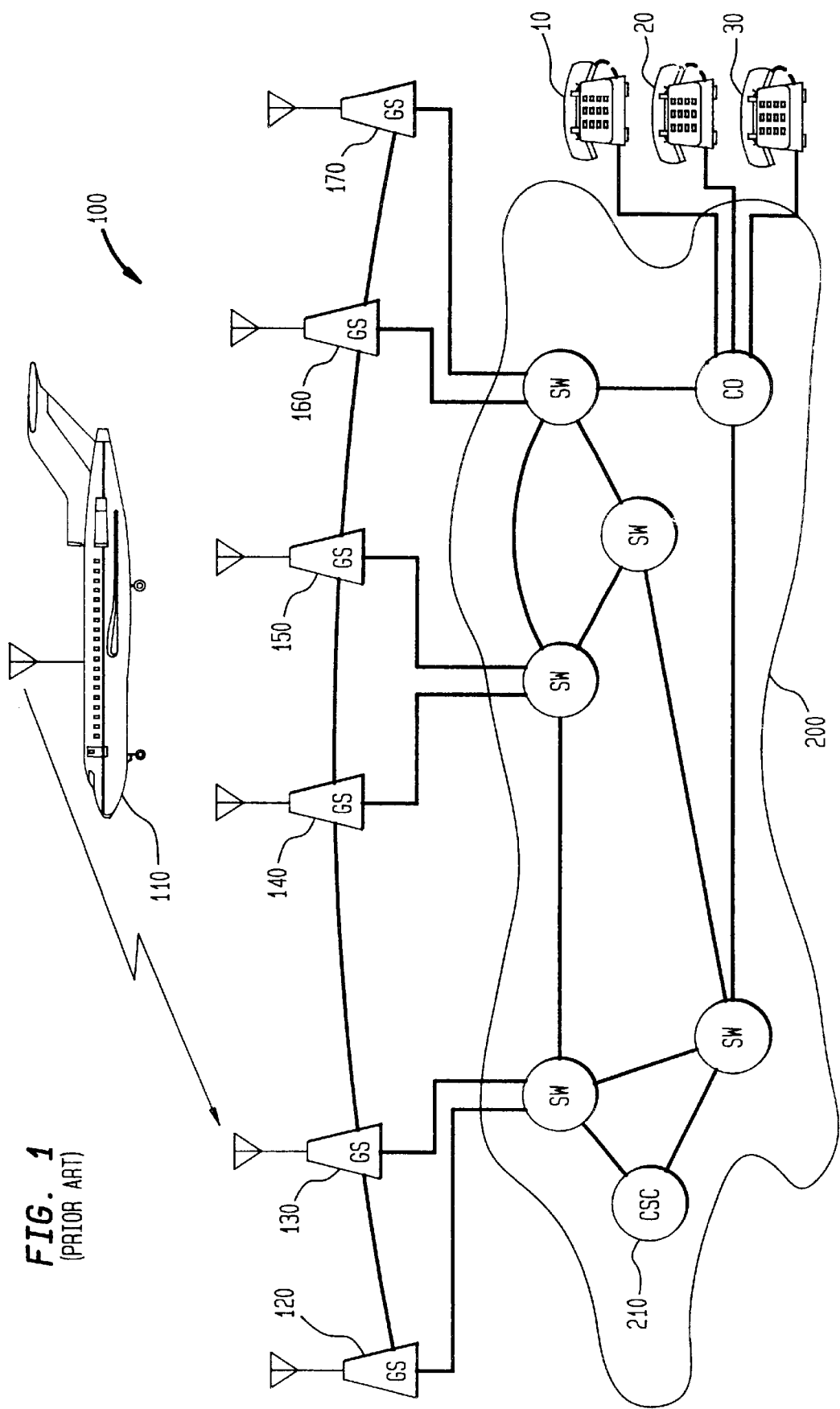
FIG. 1 is a block diagram illustrating a known wireless system.
Figure 2:
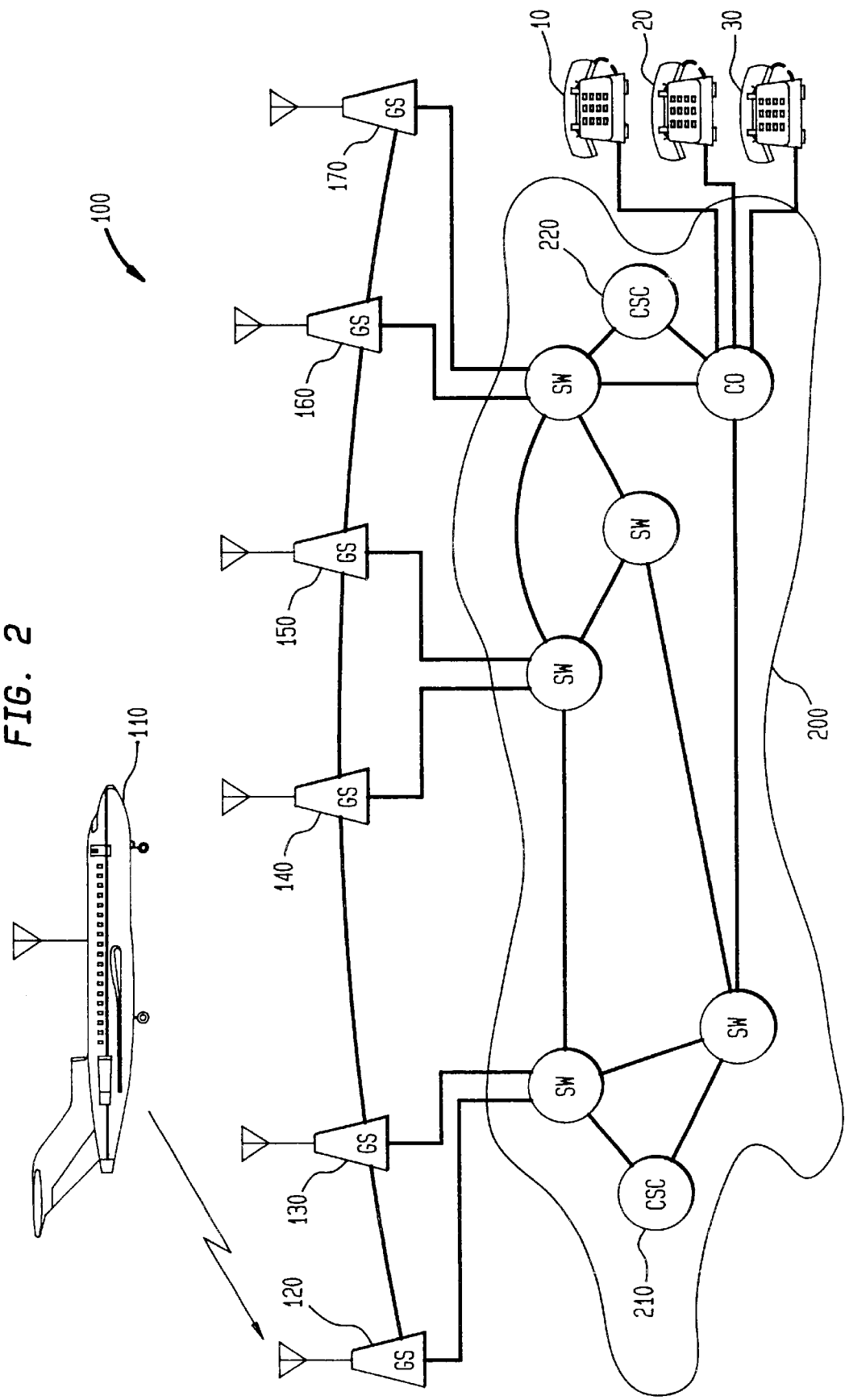
FIG. 2 is a block diagram illustrating a wireless communication system for use with the present invention.

In FIG. 2 there is shown a communication network 100 constructed in accordance with an embodiment of the present invention. There, a mobile station 110 is provided in communication with one of a plurality of ground stations 120–170. The ground stations connect to the PSTN 200. The PSTN 200 routes calls from the ground stations through to called parties, such as telephones 10–30. A plurality of CSC's 210, 220 are provided in the PSTN 200. The PSTN 200 establishes call paths from the ground stations 120–170 to the call parties 10–30 in such a way that the call paths traverse a CSC 210 or 220.

Figure 3:
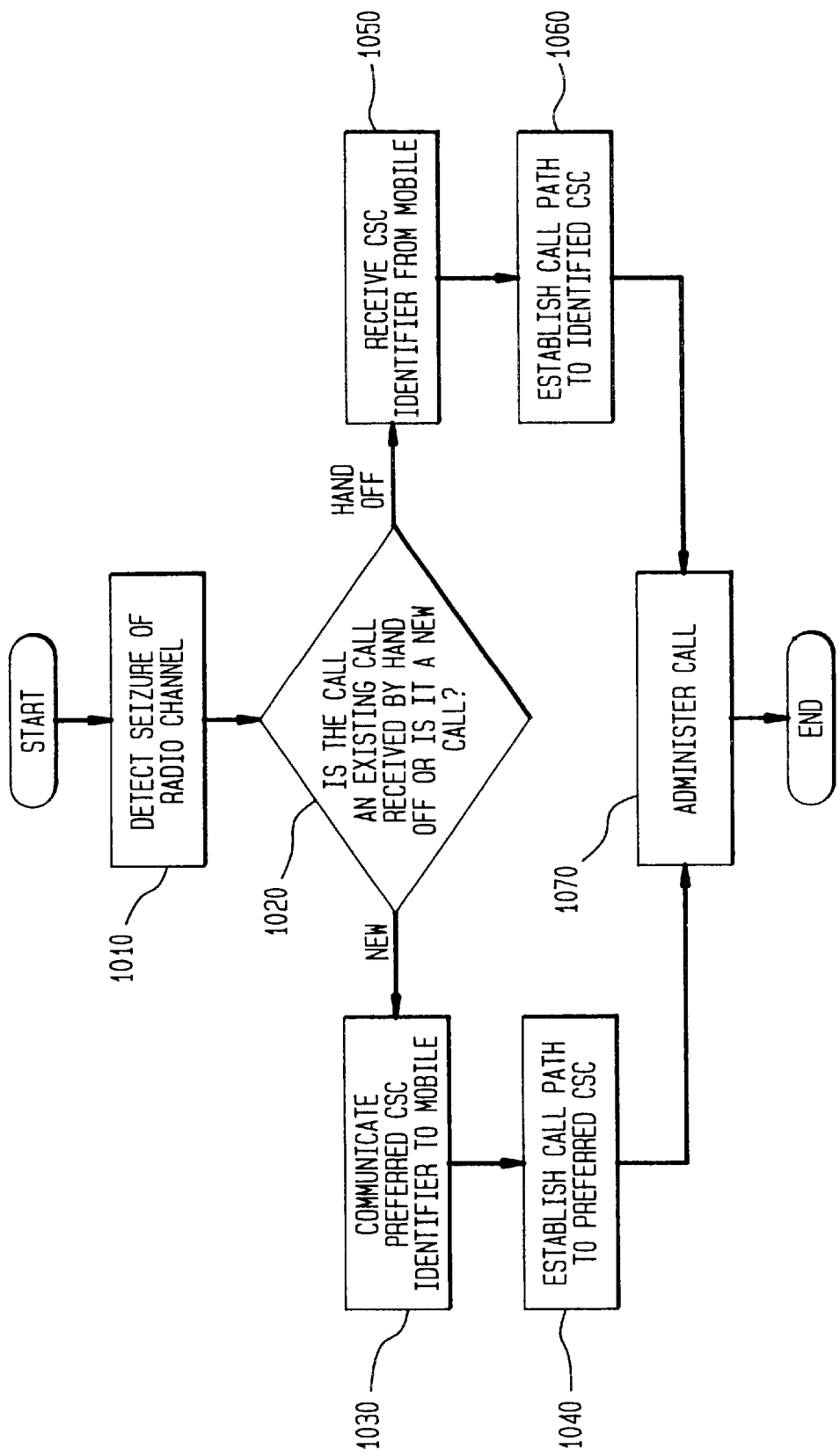
FIG. 3 is a flow diagram illustrating a method of operation of the present invention.

To coordinate among CSC'S 210, 220 in hand-off situations, the communication system 100 employs the method shown in FIG. 3. A ground station 150 detects the presence of a "new" call when a mobile station seizes a radio channel (Step 1010). Although the call is new in the sense that the ground station 150 must allocate available resources to handle the call, the call may be one of two types: It may be truly new if it originates at the ground station 150, or it may be an existing call that arrives at the ground station 150 due to hand-off. The ground station 150 decodes signaling received from the mobile station 110 to determine whether the call is a hand-off call or is truly new (Step 1020).

If the call is truly new, the ground station 150 determines which CSC will receive the call. Each ground station 120–170 is associated with a preferred CSC that the ground station uses by default. For example, an air-to-ground communication network for the United States may be provided with only two CSC'S—one for the east and one for the west. A ground station 150 may be associated with a CSC 220 based on where it is located. The ground station 150 provides a CSC identifier to the mobile station 110 (Step 1030) to be stored for later use. It establishes a call path from itself to the preferred CSC 220 (Step 1040).

If the call is one received by hand-off, the ground station 150 receives a communication from the mobile station 110 identifying a CSC to be used (Step 1050). The communication contains the CSC identifier that was sent by another ground station (such as 140) and stored by the mobile station. The ground station 150 establishes a call path from itself to the CSC identified by the mobile station (Step 1060). At the conclusion of step 1040 or step 1060, the ground station 150 handles the call according to conventional techniques (Step 1070).

An understanding of the present invention may be facilitated by a discussion of how multiple ground stations 120–170 operate on a single call. Using the wireless air-to-ground communication network of FIG. 2 as an example, suppose that ground stations 120–140 are associated with CSC 210 and ground stations 150–170 are associated with CSC 220. Assume that a caller originates a call when the air terminal 110 is in communication with ground station 120 and that the call lasts long enough for the air terminal to hand-off sequentially to ground stations 130–170.

The call begins when air terminal 110 is in communication with ground station 120. When the air terminal 110 seizes a radio channel of ground station 120, the ground station engages the method of FIG. 3 and determines that the call is truly new. It routes the call to CSC 210 according to steps 1030–1040. When hand-offs occur to ground stations 130–170, each ground station establishes a new call path to CSC 210 according to steps 1050–1060 regardless of what CSC is preferred by the ground station.

Those of skill in the art recognize that a mobile station 110 may support more than one call at a time. For example, terminals in aircraft support up to four calls at a time. In the above example, if the air terminal 110 started a second call while in communication with ground station 150, ground station 150 routes the second call to CSC 220 according to steps 1030–1040 even though it routed the first call to CSC 210 according to steps 1050–1060. The ground stations route calls individually.

Figure 4:
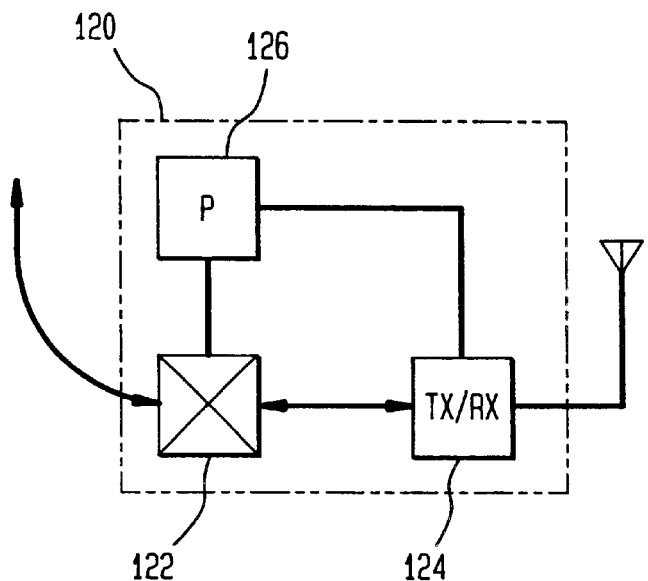
FIG. 4 is a block diagram of a ground station according to an embodiment of the present invention.

FIG. 4 illustrates an embodiment of a ground station, such as station 120. The ground station 120 includes a switch matrix 122 that connects the ground station 120 to the PSTN 200. The switch matrix 122 may accommodate one or more trunks from the PSTN 200. The ground station 120 includes a transceiver 124 that communicates with mobile stations. The transceiver 124 receives and broadcasts call traffic in radio channels according to the signaling protocol of the wireless network. The transceiver 124 also receives and broadcasts call setup information, such as the CSC identifiers described above. The ground station 120 includes a processor 126 that controls operation of the station. The switch matrix 122 and the transceiver 124 both operate under the control of the processor 126.

Figure 5:
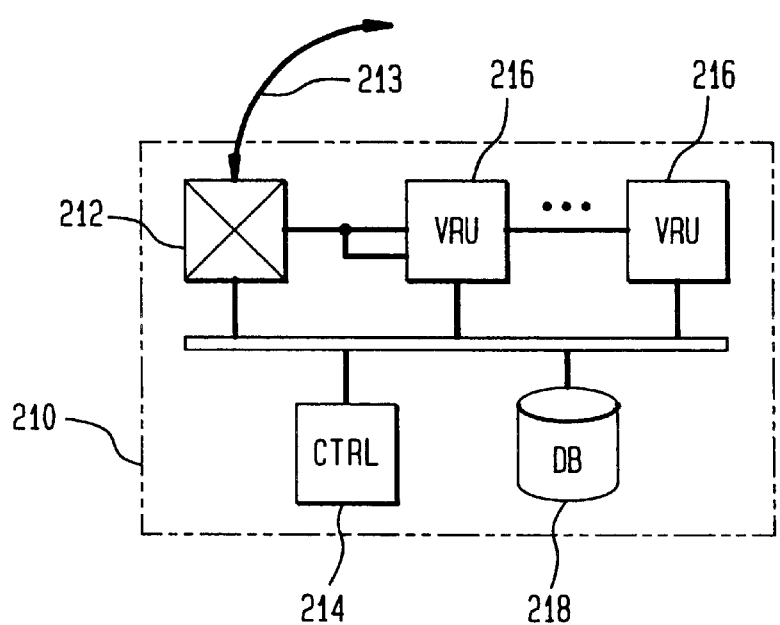
FIG. 5 is a block diagram of a call switching center according to an embodiment of the present invention.

FIG. 5 illustrates components of a CSC 210 constructed in accordance with an embodiment of the present invention. The CSC 210 includes a switch matrix 212 that receives and returns call traffic from the PSTN 200 over one or more trunks 213. The switch matrix 212 is controlled by a controller 214.

The CSC 210 typically includes one or more voice response units 216 ("VRUs"). Calls initially received at the CSC 210 may be routed to the VRU 216 to interface with a caller. As is known, VRUs may generate audio signals, including synthetic speech, to instruct callers during certain phases of a call. The VRU also decodes responses from callers, which may be speech or touch tones. Using this capability, the VRU 216 can be programmed to gather necessary billing information to process calls. The CSC 210 may include a database 218 to record billing information for calls. The VRU 210 and the database 218 operate under the control of the controller 214.

As representative examples, the following equipment may be used for the CSC components described above. The switch matrix 212 may be a switch matrix model LNX commercially available from Excel Switching Corp., of Hyannis, Mass. The controller 214 may be a model Sparc 20 workstation, commercially available from Sun Microsystems, Inc., of Palo Alto, Calif. The VRUs 216 may be CONVERSANT Map 100 systems, commercially available from Lucent Technologies, of Murray Hill, N.J.

As has been described, the present invention provides a CSC based wireless communication network having improved capacity. The network provides for multiple, spatially distributed CSC'S in the network and a call management protocol that directs call flow through the network to the various CSC's.

We claim:

1. A wireless communication system, comprising
    a communication network populated by at least two call switching centers that handle wireless calls,
    a plurality of base stations capable of communicating with mobile stations via radio links, each base station associated with one of the call switching centers as a default, the base stations responding to a new call initiated by a mobile station according to steps of:
    determining whether the new call arrived to the base station through a hand-off technique; if so,
        receiving from the mobile station an identifier of a call switching center that administered the call prior to hand-off,
        establishing a call path from the base station to the identified call switching center; and if not,
        communicating an identifier of the default call handler to the mobile station, and
        establishing a call path from the base station to the default call switching center.

2. A call handling method in a wireless communication network, comprising the steps of:
    receiving a call from a mobile station,
    determining whether the call is truly new,
    when the call is truly new:
        assigning a call handler for the call,
        communicating the assignment to the mobile station, and
    when the call is not truly new:
        receiving a call handler identifier from the mobile station, and
        routing the not truly new call to a call handler identified by the call handler identifier.

3. The method of claim 1, further comprising a step of routing the truly new call to an assigned call handler.

4. A base station for use in a wireless communication system, comprising:
    a transceiver that transmits and receives call traffic with a mobile station via radio links,
    a switch matrix that exchanges the call traffic with a communication network, and
    a processor that controls operations of the switch matrix and the transceiver, the processor causing the base station to execute the following steps in response to a new call initiated by a mobile station:
    determine whether the call arrived to the base station through
    a hand-off operation, if so, receive from the mobile station an identifier of a call handler within the network to which the new call should be routed, and signal the network to establish a call path to the call handler.

5. The base station of claim 4, wherein, when the call did not arrive through hand-off, the processor executes the following steps:

identify a default call handler to be assigned to the new call, communicate an identifier of the default call handler to the mobile station, and signal the network to establish a call path to the default call handler.

6. The base station of claim 4, wherein the base station is a ground station in a wireless air-to-ground communication network.

7. The base station of claim 4, wherein the processor invokes the steps recited when the transceiver detects that a mobile station has seized an available radio channel.

8. A wireless communication system, comprising a communication network populated by at least two call switching centers that handle calls initiated by the mobile station, a plurality of base stations capable of communicating with the mobile station via radio links, each base station associated with one of the call switching centers as a default, the base stations responding to a new call initiated by the mobile station according to steps of:

determining whether the new call arrived to the base station through a hand-off technique, if so, receiving from a mobile station associated with the handed-off call an identifier of a call switching center that administered the call prior to hand-off, establishing a call path from the base station to the identified call switching center.

9. The system of claim 8, wherein the base station executes further steps when the call did not arrive through a hand-off:

communicating an identifier of the default call handler to the mobile station, and establishing a call path from the base station to the default call switching center.

10. The system of claim 8, wherein the base station is a ground station of a wireless air-to-ground communication network.

11. The system of claim 8, wherein the mobile station initiates a new call by seizing a radio link of the base station.

12. A method of processing a new call with a mobile station in a wireless communication network, comprising the steps of:

determining whether the new call arrives through a hand-off technique; if so, receiving from the mobile station an identifier of a call handler that administered the call prior to hand-off, and routing the call to the call handler; and if not, identifying a default call handler to be assigned to the new call, communicating an identifier of the call handler to the mobile station, and routing the new call to the default call handler.

13. A method of processing a new call in a wireless communication network, comprising the steps of:

determining whether the new call arrives through a hand-off technique, if so, receiving from a mobile station associated with the handed-off call an identifier of a call handler that administered the call prior to hand-off, routing the call to the call handler.

14. The method of claim 13, further comprising, when the call did not arrive through hand-off, steps of:

identifying a default call handler to be assigned to the new call, communicating an identifier of the default call handler to the mobile station, and routing the new call to the default call handler.

15. The method of claim 13, further comprising an initial step of detecting arrival of a new call by detecting when mobile station seizes an available radio channel of the wireless network.

* * * * *